US012609389B2

(12) United States Patent
Yoo

(10) Patent No.: US 12,609,389 B2
(45) Date of Patent: Apr. 21, 2026

(54) HOLDER FOR BATTERY CELL AND BATTERY CELL ASSEMBLY COMPRISING THE SAME

(71) Applicant: LG Energy Solution, Ltd., Seoul (KR)

(72) Inventor: Dong Won Yoo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/985,996

(22) Filed: Dec. 18, 2024

(65) Prior Publication Data

US 2025/0253460 A1     Aug. 7, 2025

(30) Foreign Application Priority Data

Feb. 6, 2024     (KR) ........................ 10-2024-0018124

(51) Int. Cl.
*H01M 50/213*          (2021.01)
*H01M 50/249*          (2021.01)
(Continued)

(52) U.S. Cl.
CPC ....... *H01M 50/213* (2021.01); *H01M 50/249* (2021.01); *H01M 50/503* (2021.01); *H01M 50/507* (2021.01); *H01M 2220/20* (2013.01)

(58) Field of Classification Search
CPC ............. H01M 50/213; H01M 50/249; H01M 50/503; H01M 50/507; H01M 2220/20
See application file for complete search history.

(56) References Cited

U.S. PATENT DOCUMENTS 5,418,083 A * 5/1995 Tamaki ............... H01M 50/528
                                                                429/174
D448,341 S     9/2001 Liang
(Continued)

FOREIGN PATENT DOCUMENTS

CN          304846366          10/2018
CN          215834573 U        2/2022
(Continued)

OTHER PUBLICATIONS

Extended European Search Report including Written Opinion for Application No. 24191987.7 dated Jan. 15, 2025, pp. 1-10.
(Continued)

*Primary Examiner* — Michael L Dignan
(74) *Attorney, Agent, or Firm* — Lerner David LLP

(57)          ABSTRACT

Holders configured to detachably connect to battery cells may include a first polarity bus-bar portion configured to removably contact a first polarity terminal of a battery cell when the battery cell is positioned in an assembled location. The battery cell may have at least a portion of a casing encircling an axis of the battery cell, the portion of the casing defining the first polarity terminal. The first polarity bus-bar portion may include a first displaceable portion biased towards the assembled location of the battery cell such that the first displaceable portion is pressed into contact with the portion of the casing defining the first polarity terminal when the battery cell is in the assembled location. The holder may include a second polarity bus-bar portion configured to removably contact a second polarity terminal of the battery cell when the battery cell is positioned in the assembled location.

18 Claims, 12 Drawing Sheets

(51) Int. Cl.
    H01M 50/503    (2021.01)
    H01M 50/507    (2021.01)

(56) References Cited

U.S. PATENT DOCUMENTS

| | | | |
|---|---|---|---|
| D448,726 | S | 10/2001 | Liang |
| D451,070 | S | 11/2001 | Liang |
| D451,071 | S | 11/2001 | Liang |
| D451,470 | S | 12/2001 | Liang |
| D451,471 | S | 12/2001 | Liang |
| 6,524,739 | B1 | 2/2003 | Iwaizono et al. |
| D471,154 | S | 3/2003 | Liang |
| D472,210 | S | 3/2003 | Tada et al. |
| D536,302 | S | 2/2007 | Hayashi et al. |
| D558,671 | S | 1/2008 | Chen |
| D573,947 | S | 7/2008 | Kishimoto et al. |
| D578,962 | S | 10/2008 | Foreman et al. |
| D586,300 | S | 2/2009 | Wang |
| D602,433 | S | 10/2009 | Katou et al. |
| D668,225 | S | 10/2012 | Lyford et al. |
| 8,568,915 | B2 * | 10/2013 | Fuhr ............... H01M 50/559 |
| | | | 429/178 |
| D729,165 | S | 5/2015 | Liu |
| D730,289 | S | 5/2015 | Ilkhanov et al. |
| D732,480 | S | 6/2015 | Makinen |
| D757,907 | S | 5/2016 | Foreman et al. |
| D760,166 | S | 6/2016 | Cooper |
| D774,452 | S | 12/2016 | Rost |
| D844,557 | S | 4/2019 | Wang |
| 10,304,641 | B2 | 5/2019 | Watanabe |
| 10,497,912 | B2 | 12/2019 | Liu et al. |
| D872,037 | S | 1/2020 | Okajima et al. |
| D878,311 | S | 3/2020 | Watanabe |
| D879,038 | S | 3/2020 | Koike et al. |
| D885,354 | S | 5/2020 | Watanabe |
| D908,112 | S | 1/2021 | Eshelman et al. |
| D908,113 | S | 1/2021 | Eshelman et al. |
| D924,145 | S | 7/2021 | Martins et al. |
| D924,146 | S | 7/2021 | Martins et al. |
| D944,203 | S | 2/2022 | Varatharajah et al. |
| D988,253 | S | 6/2023 | Watanabe et al. |
| D990,441 | S | 6/2023 | Lee et al. |
| D1,001,061 | S | 10/2023 | Wang |
| 11,831,041 | B2 | 11/2023 | Kim et al. |
| D1,012,853 | S | 1/2024 | Su et al. |
| D1,039,480 | S | 8/2024 | Wigney |
| D1,040,087 | S | 8/2024 | Cowley et al. |
| D1,051,057 | S | 11/2024 | Gahng et al. |
| D1,075,680 | S | 5/2025 | Okamura |
| D1,085,015 | S | 7/2025 | Aguiar et al. |
| D1,086,055 | S | 7/2025 | Painter et al. |
| D1,086,058 | S | 7/2025 | Painter et al. |
| 2002/0006544 | A1 | 1/2002 | Asaka et al. |
| 2016/0240825 | A1 | 8/2016 | Ro et al. |
| 2020/0083494 | A1 * | 3/2020 | Bae ............... H01M 50/152 |
| 2020/0176735 | A1 | 6/2020 | Muratsu et al. |
| 2020/0395587 | A1 * | 12/2020 | Ryu ............... H01M 50/56 |
| 2021/0320384 | A1 | 10/2021 | Kim et al. |
| 2023/0231235 | A1 * | 7/2023 | Jung ............... H01M 50/152 |
| 2023/0318149 | A1 * | 10/2023 | Wang ............... H01M 50/509 |
| | | | 429/158 |
| 2024/0014599 | A1 | 1/2024 | Wolf et al. |
| 2024/0072387 | A1 | 2/2024 | Park et al. |
| 2024/0079734 | A1 * | 3/2024 | Ford ............... H01M 10/0404 |
| 2024/0291197 | A1 | 8/2024 | Eheim et al. |
| 2024/0313326 | A1 | 9/2024 | He et al. |
| 2025/0038335 | A1 | 1/2025 | Qiu et al. |
| 2025/0125462 | A1 * | 4/2025 | Hodge ............... H01M 10/6554 |
| 2025/0141057 | A1 * | 5/2025 | Li ............... H01M 50/519 |
| 2025/0253460 | A1 | 8/2025 | Yoo |

FOREIGN PATENT DOCUMENTS

| | | |
|---|---|---|
| CN | 219350572 U | 7/2023 |
| CN | 220121911 U | 12/2023 |
| GB | 2590460 A | 6/2021 |
| JP | H10284029 A | 10/1998 |
| JP | 2002033088 A | 1/2002 |
| JP | 2010177204 A | 8/2010 |
| KR | 20010024564 A | 3/2001 |
| KR | 20160100673 A | 8/2016 |
| KR | 102203249 B1 | 1/2021 |
| KR | 20220163131 A | 12/2022 |
| KR | 102578159 B1 | 9/2023 |
| WO | 2019058938 A1 | 3/2019 |

OTHER PUBLICATIONS

Yoo, D.W., "Connector for Cylindrical Battery," U.S. Appl. No. 29/955,963, filed Aug. 5, 2024.
Yoo, D.W., "Connector for Cylindrical Battery," U.S. Appl. No. 29/955,990, filed Aug. 5, 2024.
Yoo, D.W., "Connector for Cylindrical Battery," U.S. Appl. No. 29/955,983, filed Aug. 5, 2024.
Yoo, D.W., "Connector for Cylindrical Battery," U.S. Appl. No. 29/955,992, filed Aug. 5, 2024.
Yoo, D.W., "Connector for Cylindrical Battery," U.S. Appl. No. 29/955,971, filed Aug. 5, 2024.
Yoo, D.W., "Connector for Cylindrical Battery," U.S. Appl. No. 29/955,997, filed Aug. 5, 2024.
Yoo, D.W., "Connector for Cylindrical Battery," U.S. Appl. No. 29/955,978, filed Aug. 5, 2024.
Yoo, D.W., "Connector for Cylindrical Battery," U.S. Appl. No. 29/956,004, filed Aug. 5, 2024.
Battery Contact 21700 Stamped Metal Case, date posted unavailable, data retrieved from the Internet at https://www.alibaba.com/product-detail/Battery-Contact-21700-Stamped-Metai-Case_160117 4912653.html (Sep. 2024). 1 pg.
SMD Battery Holders, date posted May 16, 2022, data retrieved from the Internet at https://web.archive.org/web/20220516095236/https://www.fbelec.com/cylindrica-battery-holder/. 1 pg.

* cited by examiner

[Figure 1]
Prior Art
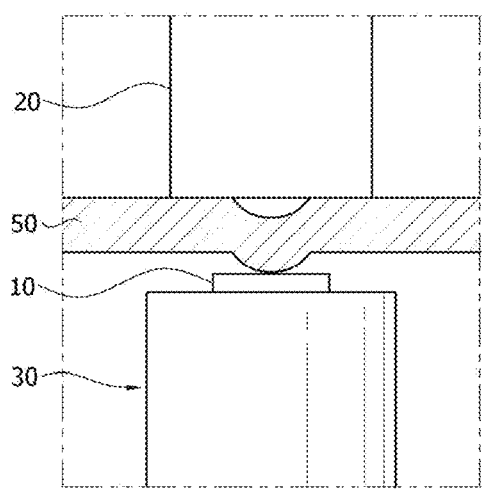
[Figure 2]
Prior Art
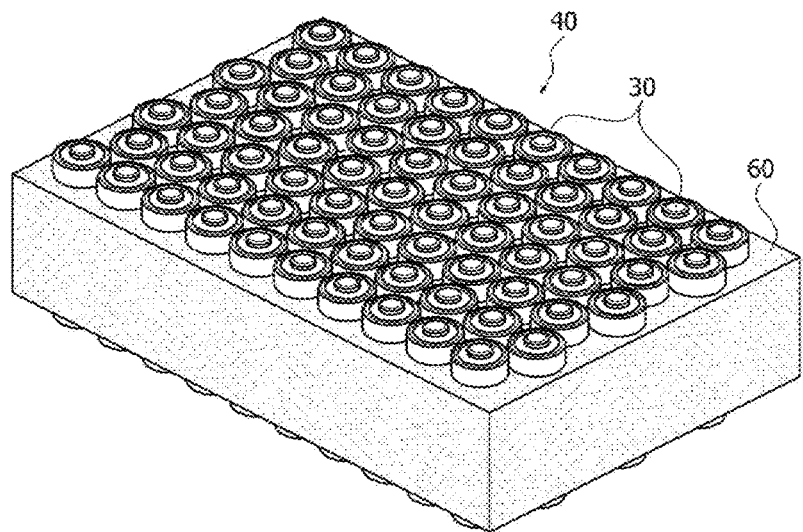

[Figure 3]
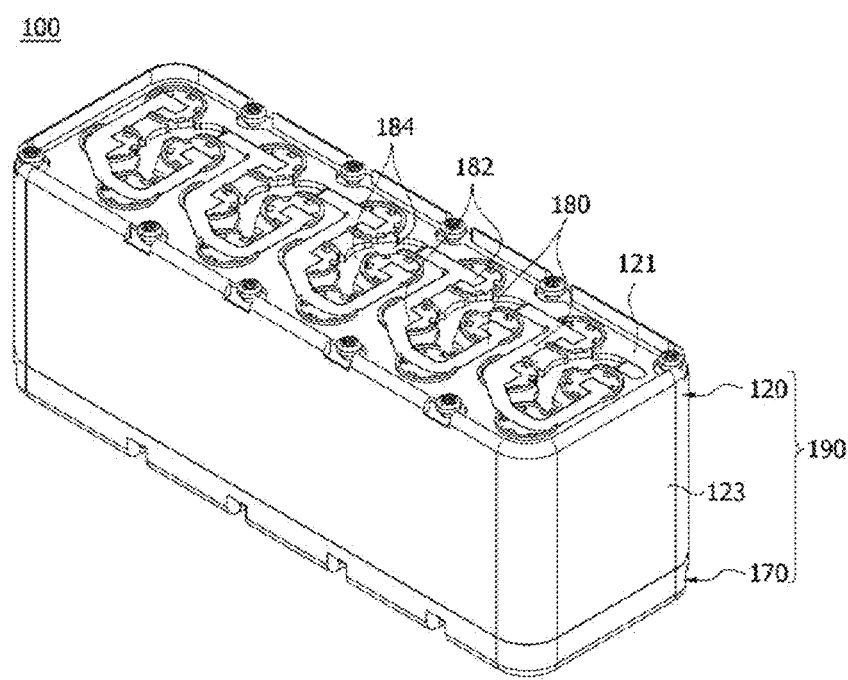

[Figure 4]
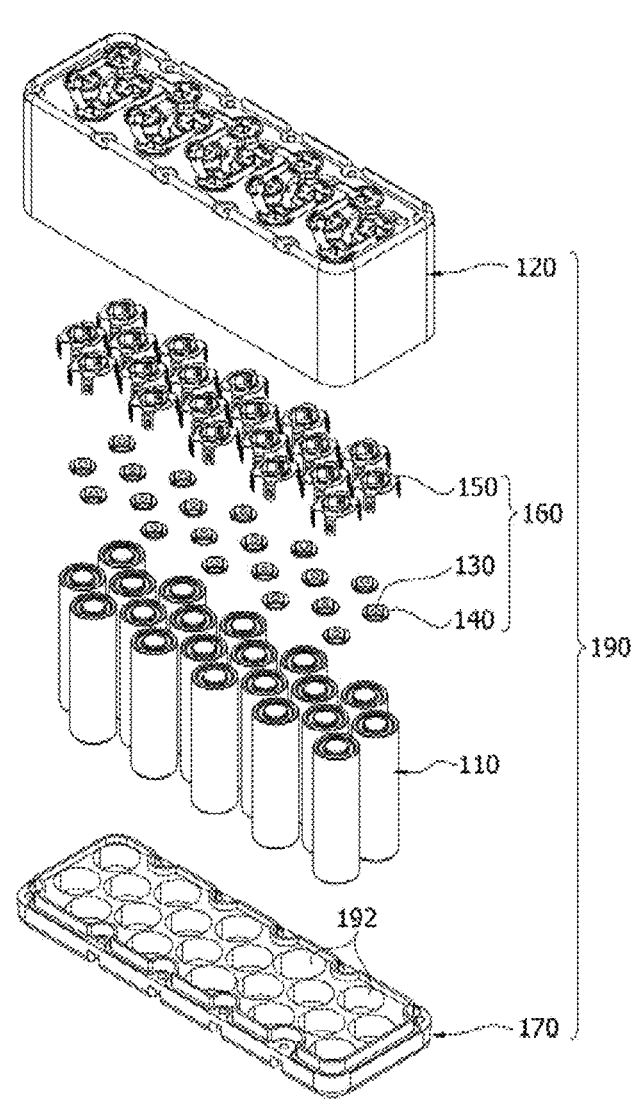

[Figure 5]
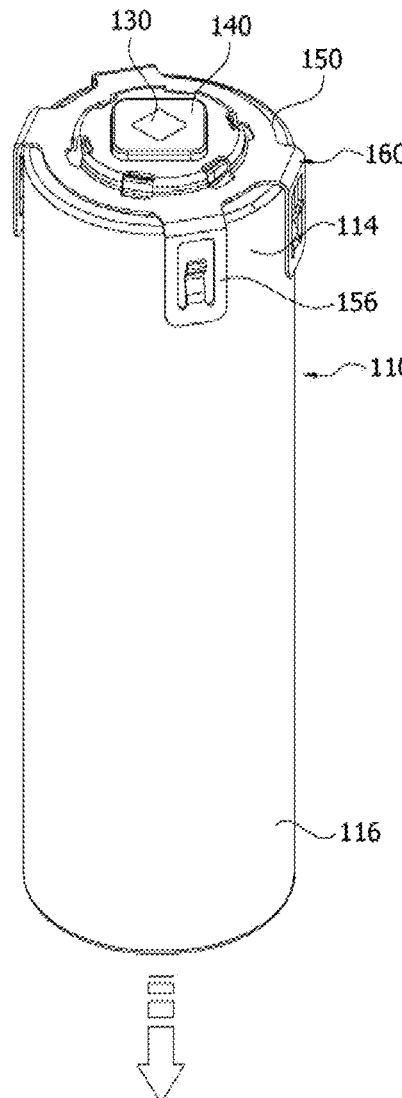

[Figure 6]
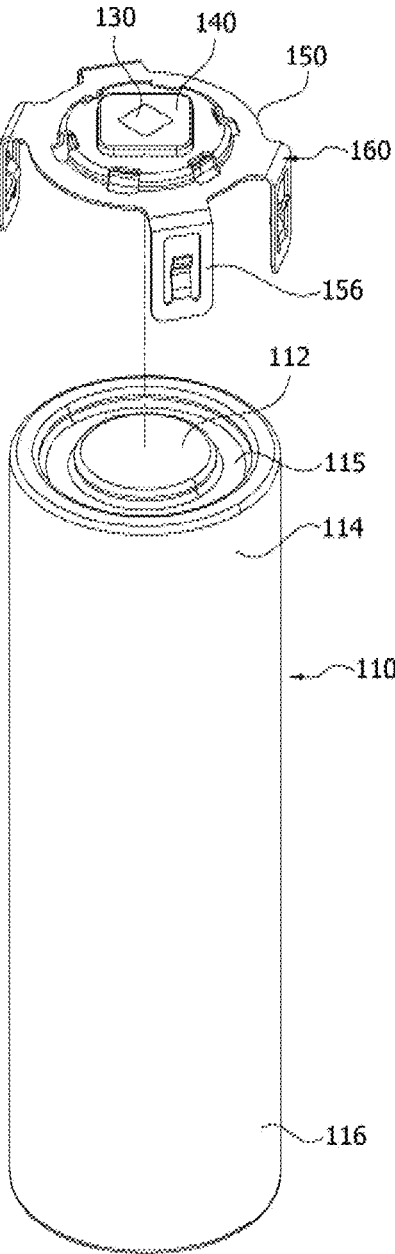

[Figure 7]
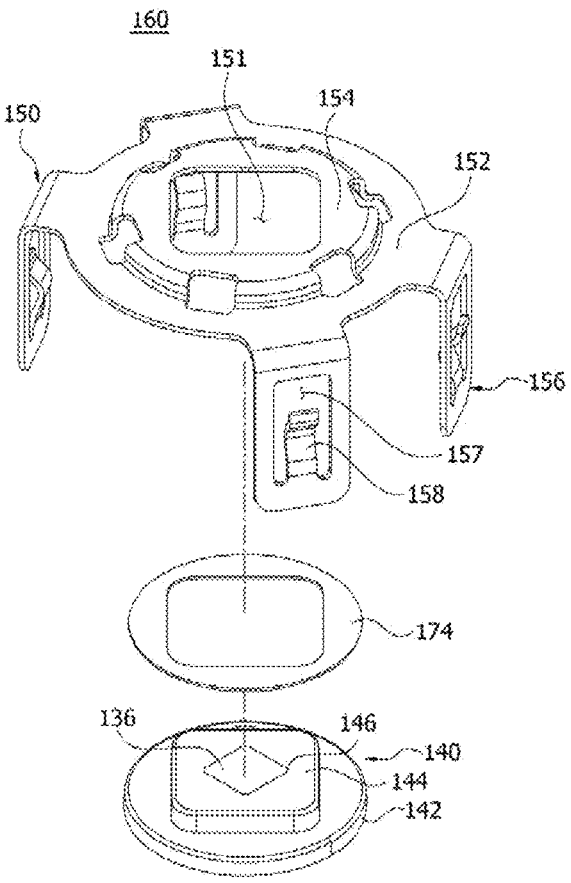

[Figure 8]
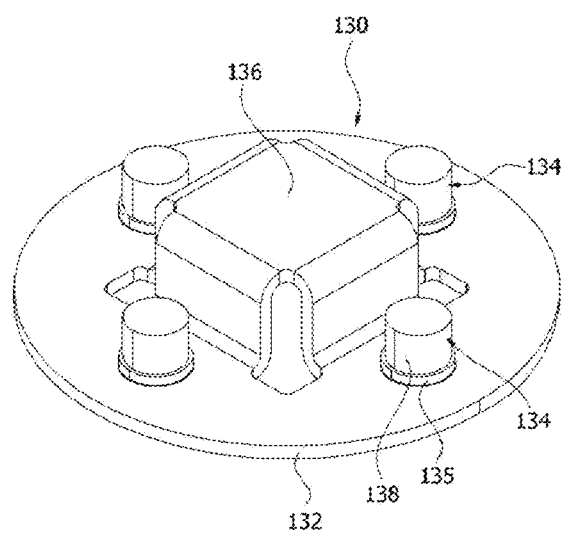
[Figure 9]
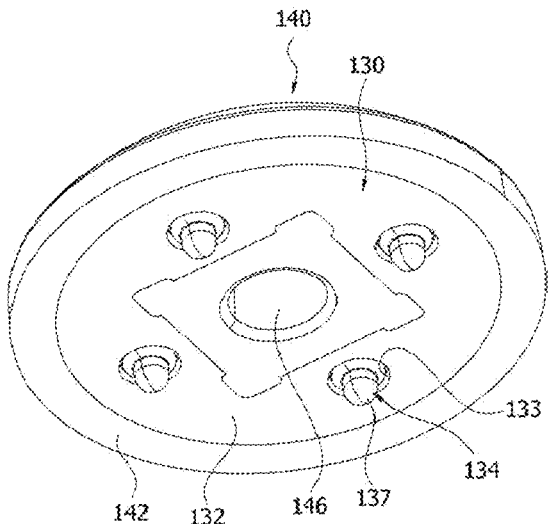

[Figure 10]
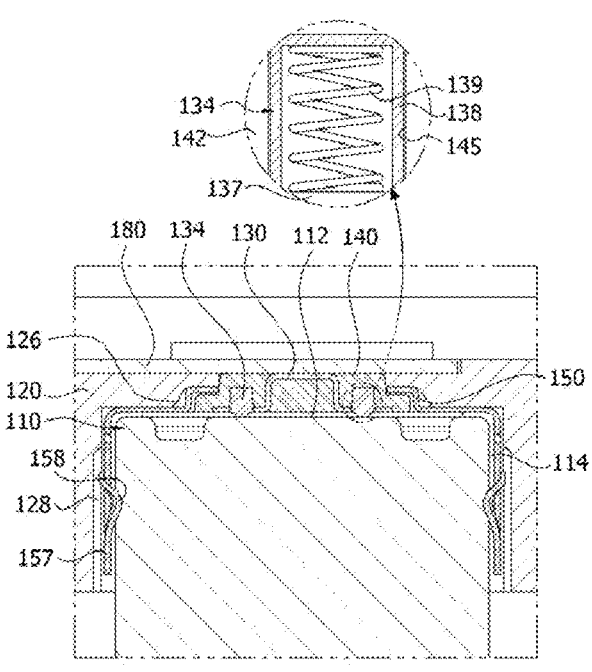

[Figure 11]
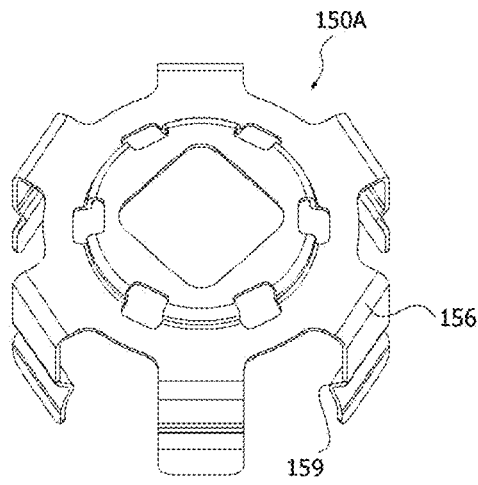
[Figure 12]
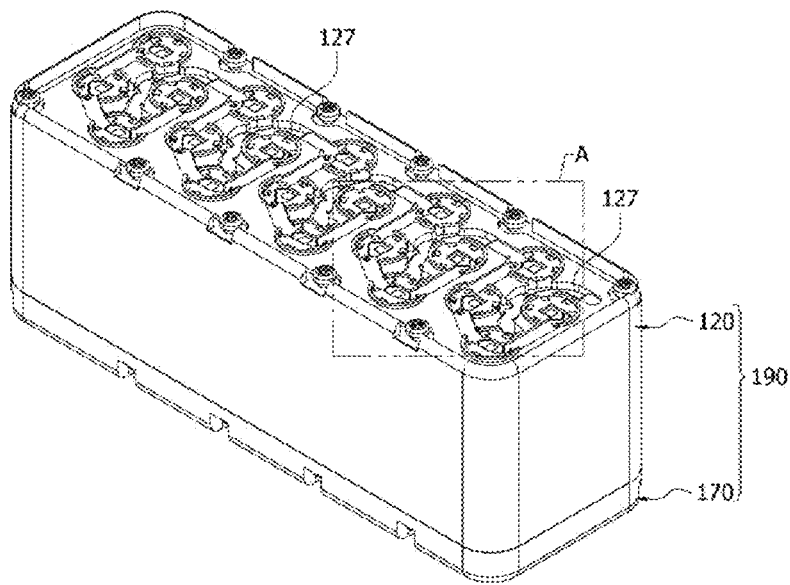

[Figure 13]
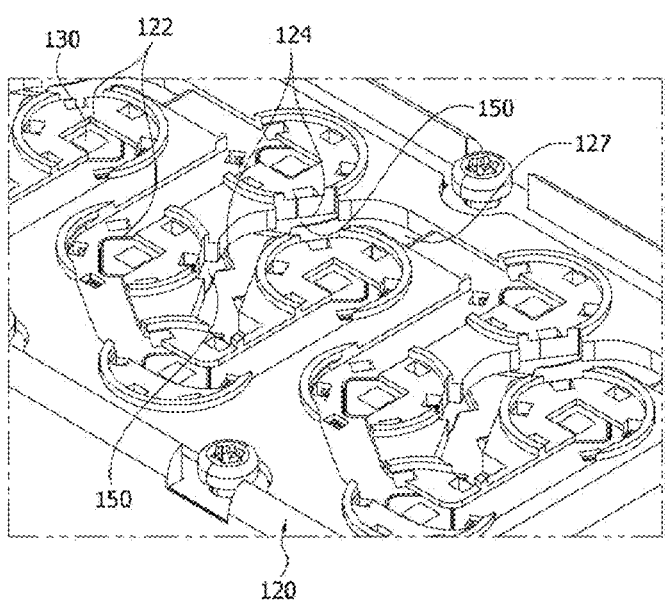
[Figure 14]
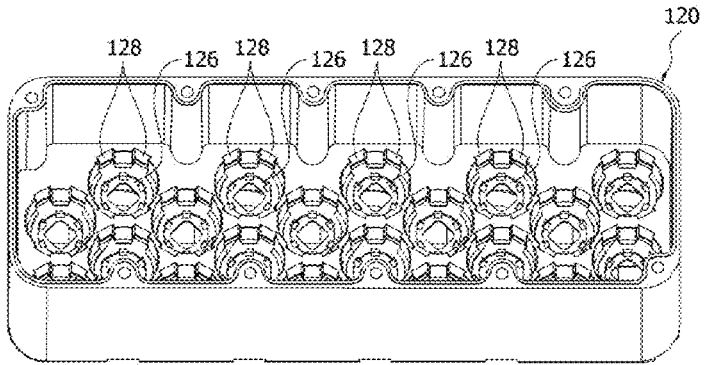

[Figure 15]
200
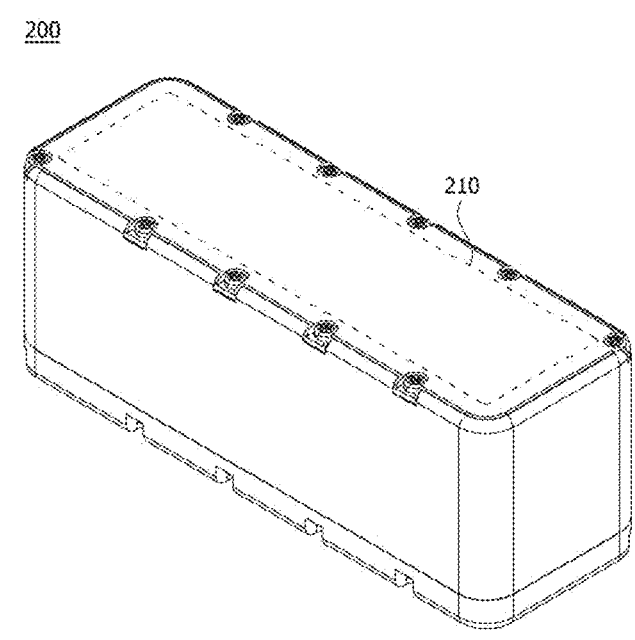

[Figure 16]
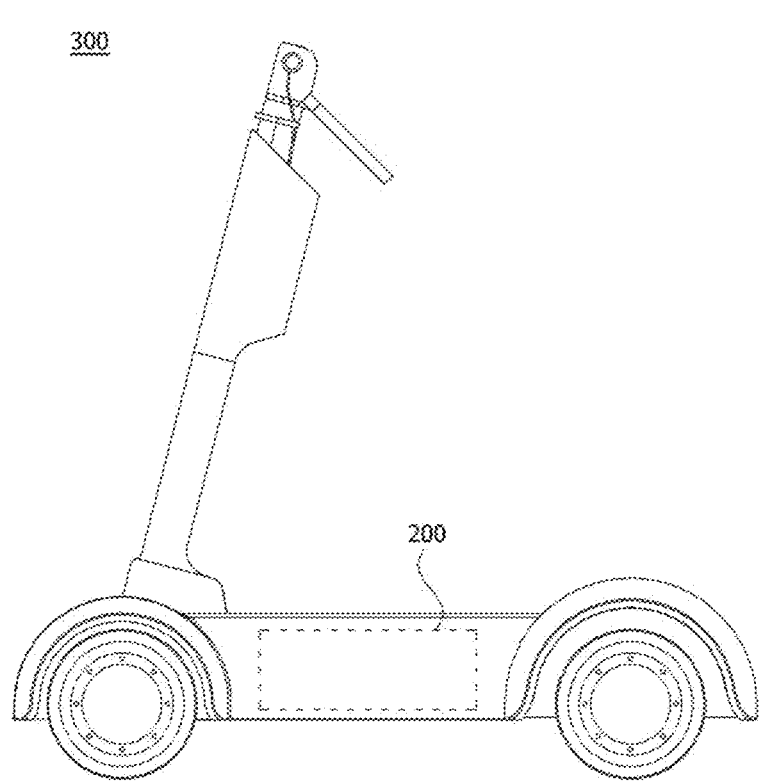

1

HOLDER FOR BATTERY CELL AND BATTERY CELL ASSEMBLY COMPRISING THE SAME

CROSS-REFERENCE TO RELATED APPLICATIONS

The present application claims priority to Korean Patent Application No. 10-2024-0018124 filed on Feb. 6, 2024, the disclosure of which is incorporated by reference in its entirety.

TECHNICAL FIELD

The present disclosure relates to holders for battery cells and battery cell assemblies comprising the same.

BACKGROUND

Rechargeable secondary batteries have been widely used as an energy source for wireless mobile devices. In addition, secondary batteries have also attracted attention as an energy source for electric transportation devices, hybrid electric transportation devices, and the like. Such transportation devices are proposed as a solution to air pollution from existing gasoline transportation devices, diesel transportation devices, and other transportation devices that use fossil fuels. Therefore, the applications of secondary batteries are very diverse, and it is expected that secondary batteries will be applied to more fields and products in the future.

Generally, a secondary battery may comprise a plurality of battery cells. Depending on the shape of the battery case, such battery cells may be cylindrical or rectangular battery cells or pouch-type battery cells. In cylindrical or rectangular battery cells, an electrode assembly is embedded into a cylindrical or rectangular metal case. In pouch-type battery cells, an electrode assembly is embedded into a pouch-type case of an aluminum laminate sheet. The electrode assembly embedded into the battery case is a power generation element comprising a positive electrode, a negative electrode, and a separator interposed between the positive and negative electrodes. The power generation element is capable of charging and discharging. The power generation element may be a jelly-roll type comprising a separator interposed between long sheet-shaped positive and negative electrodes coated with active materials which are wound. The power generation element may be a stack type in which multiple positive and negative electrodes with a certain size are sequentially laminated with separators interposed therebetween.

There is a need to develop improved holders for battery cells and battery assemblies comprising the same.

SUMMARY

The present disclosure is intended to address one or more problems occurring in conventional holders for battery cells and battery assemblies comprising the same.

In one or more aspects of the present disclosure, a holder may be configured to detachably connect to a battery cell of a battery cell assembly. A battery cell assembly may comprise a housing and a plurality of holders. The housing may be configured to receive a plurality of battery cells within an interior of the housing, and the holders may be positioned within the interior of the housing and coupled to the housing. Aspects of the holders and battery cell assemblies of the present disclosure may reduce replacement cost and time of battery cells and lower maintenance costs of the battery cell assemblies.

According to a first aspect of the present disclosure a holder configured to detachably connect to a battery cell of a battery cell assembly comprises a first polarity bus-bar portion configured to removably contact a first polarity terminal of a battery cell when the battery cell is positioned in an assembled location in the battery cell assembly, the battery cell having at least a portion of a casing encircling an axis of the battery cell, the portion of the casing defining the first polarity terminal, wherein the first polarity bus-bar portion includes a first displaceable portion biased towards the assembled location of the battery cell such that the first displaceable portion is pressed into contact with the portion of the casing defining the first polarity terminal when the battery cell is in the assembled location; and a second polarity bus-bar portion configured to removably contact a second polarity terminal of the battery cell when the battery cell is positioned in the assembled location.

A second aspect of the present disclosure comprises the first aspect, wherein the first displaceable portion is a portion of an elongated extension of the first polarity bus-bar portion, the elongated extension oriented so as to extend along the portion of the casing when the battery cell is in the assembled position.

A third aspect of the present disclosure comprises the second aspect, wherein the elongated extension defines an opening, the first displaceable portion being biased towards the assembled location of the battery cell through the opening.

A fourth aspect of the present disclosure comprises any one of the first to third aspects, wherein the first polarity bus-bar portion includes a second displaceable portion and a third displaceable portion, and wherein the first, second, and third displaceable portions are circumferentially spaced apart around the assembled location of the battery cell.

A fifth aspect of the present disclosure comprises any one of the first to fourth aspects, wherein the first polarity bus-bar portion includes a second displaceable portion positioned on an opposing side of the assembled location from the first displaceable portion, the second displaceable portion biased towards the assembled location of the battery cell such that the second displaceable portion is pressed into contact with the portion of the casing defining the first polarity terminal when the battery cell is in the assembled location.

A sixth aspect of the present disclosure comprises the fifth aspect, wherein the first polarity bus-bar portion includes a third displaceable portion and a fourth displaceable portion, the third and fourth displaceable portions opposing one another across the assembled location of the battery cell, and wherein the third and fourth displaceable portions are each biased towards the assembled location of the battery cell such that the third and fourth displaceable portions are pressed into contact with the portion of the casing defining the first polarity terminal when the battery cell is in the assembled location.

A seventh aspect of the present disclosure comprises the fifth aspect, wherein the second polarity bus-bar portion is positioned along the axis of the battery cell when the battery cell is positioned in the assembled location, such that the second polarity bus-bar portion is in a region between the first displaceable portion and the second displaceable portion.

An eighth aspect of the present disclosure comprises any one of the first to seventh aspects, wherein the second polarity bus-bar portion is positioned adjacent to an end of the battery cell along the axis when the battery cell is positioned in the assembled location.

A ninth aspect of the present disclosure comprises the eighth aspect, wherein the second polarity bus-bar portion includes a displaceable member biased towards the assembled location of the battery cell in a direction parallel to the axis of the battery cell, such that the displaceable member is pressed into contact with the second polarity terminal when the battery cell is in the assembled location, the second polarity terminal being at the end of the battery cell along the axis.

A tenth aspect of the present disclosure comprises the ninth aspect, wherein the displaceable member is biased towards the assembled location of the battery cell by an elastic member positioned between the displaceable member and a portion of the second polarity bus-bar portion extending transverse to the axis of the battery cell when the battery cell is positioned in the assembled location.

An eleventh aspect of the present disclosure comprises any one of the first through tenth aspects, further comprising an electrically insulating material positioned between the first polarity bus-bar portion and the second polarity bus-bar portion.

A twelfth aspect of the present disclosure comprises the eleventh aspect, wherein the electrically insulating material is molded around a conductive portion of the second polarity bus-bar portion.

A thirteenth aspect of the present disclosure comprises the eleventh aspect, wherein the electrically insulating material surrounds an opening therethrough so as to permit electrical contact with a conductive portion of the second polarity bus-bar portion through the opening.

A fourteenth aspect of the present disclosure comprises any one of the first through thirteenth aspects, wherein the first polarity bus-bar portion and the second polarity bus-bar portion are coupled together with the first polarity bus-bar portion being disposed above the second polarity bus-bar portion along the axis of the battery cell when the battery cell is in the assembled location, the first polarity bus-bar portion defining an opening therethrough so as to permit electrical contact with a conductive portion of the second polarity bus-bar portion through the opening.

According to a fifteenth aspect of the present disclosure, a battery assembly comprises a housing configured to receive a plurality of battery cells in the respective assembled locations within an interior of the housing, the housing being openable so as to access the interior of the housing and a plurality of holders as defined in any one of the first through fourteenth aspects, each of the plurality of holders being positioned within the interior and coupled to the housing.

A sixteenth aspect of the present disclosure comprises the fifteenth aspect, wherein the housing includes an upper cover detachably secured to a lower cover.

A seventeenth aspect of the present disclosure comprises the fifteenth aspect or the sixteenth aspect, further comprising a plurality of battery cells positioned in the respective assembled locations within the interior of the housing, each of the plurality of battery cells being engaged with a respective one of the plurality of holders such that the first polarity bus-bar portion of the respective holder contacts the first polarity terminal of the respective battery cell and the second polarity bus-bar portion of the respective holder contacts the second polarity terminal of the respective battery cell.

An eighteenth aspect of the present disclosure comprises the seventeenth aspect, wherein each of the plurality of battery cells is a cylindrical battery cell, such that the portion of the casing encircling the axis of the battery cell has a circular profile orthogonal to the axis.

A nineteenth aspect of the present disclosure comprises the seventeenth aspect or the eighteenth aspect, wherein the portion of the casing encircling the axis of each of the battery cells has a smooth outer surface against which the respective first displaceable portion is pressed into contact.

A twentieth aspect of the present disclosure comprises any one of the seventeenth to nineteenth aspects, wherein the first polarity terminal of each of the battery cells has a negative polarity, and wherein the second polarity terminal of each of the battery cells has a positive polarity.

According to a twenty-first aspect of the present disclosure a transportation device comprises the battery assembly of any one of the fifteenth to twentieth aspects.

DESCRIPTION OF THE DRAWINGS

FIG. 1 is a cross-sectional diagram schematically showing a welding process of a prior art battery cell and a bus-bar.

FIG. 2 is a perspective diagram schematically showing a prior art battery cell assembly including battery cells fixed using an adhesive.

FIG. 3 is a perspective diagram schematically showing a battery cell assembly according to an aspect of the present disclosure.

FIG. 4 is an exploded perspective diagram schematically showing a battery cell assembly according to an aspect of the present disclosure.

FIG. 5 is a perspective diagram schematically showing a holder and a battery cell according to an aspect of the present disclosure.

FIG. 6 is an exploded perspective diagram schematically showing a holder and a battery cell separated from each other according to an aspect of the present disclosure.

FIG. 7 is an exploded perspective diagram schematically showing components of a holder separated from each other according to an aspect of the present disclosure.

FIG. 8 is an exploded perspective diagram schematically showing a second polarity bus-bar portion of a holder according to an aspect of the present disclosure.

FIG. 9 is a bottom perspective diagram schematically showing components of a holder according to an aspect of the present disclosure.

FIG. 10 is a partial cross-sectional diagram schematically showing a holder and a battery cell according to an aspect of the present disclosure.

FIG. 11 is a perspective diagram schematically showing a first polarity bus-bar portion of a holder according to an aspect of the present disclosure.

FIG. 12 is a perspective diagram schematically showing a battery cell assembly according to an aspect of the present disclosure.

FIG. 13 is a partial perspective diagram schematically showing a region A of the battery cell assembly of FIG. 12.

FIG. 14 is a bottom perspective diagram schematically showing a housing of a battery cell assembly according to an aspect of the present disclosure.

FIG. 15 is a schematic diagram schematically showing a battery pack according to an aspect of the present disclosure.

FIG. 16 is a schematic diagram schematically showing a transportation device according to an aspect of the present disclosure.

DETAILED DESCRIPTION

Hereinafter, holders configured to detachably connect to a battery cell and battery assemblies comprising such holders, according to aspects of the present disclosure will be described in detail with reference to the attached drawings.

In addition, the same or corresponding components are given by the same or similar reference numerals. Duplicate descriptions of the same or corresponding components in multiple drawings may be omitted. Additionally, the size and shape of each component shown in the drawings can be exaggerated or reduced. In other words, the drawings are not necessarily to scale.

FIG. 1 is a cross-sectional diagram schematically showing a conventional welding process of a general battery cell (30) and a bus-bar (50). FIG. 2 is a perspective diagram schematically showing a conventional battery cell assembly (40) including battery cells (30) fixed using an adhesive (60).

Referring to FIGS. 1 and 2, a battery pack (not shown) comprising a battery cell assembly (or battery cell laminate) comprising multiple battery cells (30), and a battery management system is used to supply a power source to various electronic devices. As shown in FIG. 1, the battery cell assembly (40) is electrically connected by a method, such as resistance welding, using a resistance welding rod (20) between an electrode terminal (10) of each of multiple battery cells (30) mounted therein and a bus-bar (50) in the form of a metal plate.

Still referring to FIG. 2, the battery cells (30) of the conventional battery cell assembly may be fixed using an adhesive (60) (potting resin) or the like inside an exterior case (not shown) of the battery cell assembly (40) to prevent damage to the electrical connection by outer shocks.

In the conventional battery cell assembly (40), when problems such as overdischarge, damage, or short circuit occurred in some battery cells (30) among multiple battery cells (30), it was difficult to replace the battery cells (30) in which the problems occurred individually. Since multiple battery cells (30) were bonded to the bus-bar (50), damage to the bus-bar (50) occurred upon separating them from the bus-bar (50) and it was easy for the electrical connection of the normal battery cells (30) and the bus-bar (50) to be broken. Also, to separate the battery cell (30) fixed in the external case with the adhesive (60), the adhesive (60) must be removed. However, removing the adhesive (60) was expensive and time-consuming, thereby making it inefficient.

Therefore, a conventional battery cell assembly (40) comprising defective battery cells (30) is usually replaced with a new battery cell assembly (40). In such a replacement, normal battery cells (30) are discarded together with defective battery cells (30), and it is difficult to recycle the discarded battery cells. This increases the maintenance costs of the battery cell assembly (40) and causes environmental pollution.

Aspects of holders configured to detachably connect a battery cell of a battery cell assembly and battery cell assemblies comprising such holders address at least some of these problems and are described in more detail hereinbelow, with reference to the figures.

FIG. 3 is a perspective diagram schematically showing a battery cell assembly (100) according to an aspect of the present disclosure. FIG. 4 is an exploded perspective diagram schematically showing a battery cell assembly (100) according to an aspect of the present disclosure. FIG. 5 is a perspective diagram schematically showing a battery cell (110) and a holder (160) of a battery cell assembly (100)

assembled according to an aspect of the present disclosure. FIG. 6 is an exploded perspective diagram schematically showing a battery cell (110) and a holder (160) of a battery cell assembly (100) according to an aspect of the present disclosure.

Referring to FIG. 4, the battery cell assembly (100), according to an aspect of the present disclosure, comprises a plurality of battery cells (110). In one or more aspects, the plurality of battery cells (110) may comprise cylindrical battery cells. In some aspects, each of the plurality of battery cells (110) is a cylindrically battery cell, such that the portion of the casing (116) encircling the axis of the battery cell (110) has a circular profile in a plane orthogonal to the axis. However, the outer shape of the battery cell (110) is not necessarily limited to a cylindrical shape. In some aspects, the battery cell (110) may be a rectangular battery cell with a cuboidal outer shape.

Referring now to FIGS. 5 and 6, each of the plurality of battery cells (110) may be equipped with a first polarity terminal (114) and a second polarity terminal (112). In one or more aspects, the first polarity terminal (114) may be a negative electrode terminal. The second polarity terminal (112) may be a positive electrode terminal. In one or more aspects, the battery cell (110) comprises an electrode assembly, a casing (116) accommodating the electrode assembly (not shown) therein, and a cap assembly (115) coupled to the upper portion of the casing (116). The second polarity terminal (112) may be located at the upper portion of the cap assembly (115). The battery cell may have at least a portion of the casing (116) encircling an axis of the battery cell (110). The portion of the casing (116) may define the first polarity terminal (114). In one or more aspects, the battery cell (110) may be filled with an electrolyte. In FIG. 6, the shape of the casing (116) is shown as a cylindrical shape. However, the casing (116) is not necessarily limited to a cylindrical shape, and may have a rectangular or cuboidal outer shape in some aspects.

In one or more aspects, the electrode assembly may comprise a positive electrode, a negative electrode, and a separator interposed between the positive electrode and the negative electrode. The electrode assembly may be wound to form a roll. The positive electrode may be made of metallic lithium or an active material containing a lithium alloy. The negative electrode may be made of carbon or an active material containing lithium such as metal oxide. The separator may be manufactured to include a non-conductive polymer such as polyolefin.

The casing (116) may be formed of an electrically conductive metal material. The outer wall of the casing (116) may have mechanical rigidity to protect internal components such as the electrode assembly (not shown) and the electrolyte from the outside. The casing (116) may be electrically connected to the negative electrode.

In one or more aspects, the cap assembly (115) may be equipped with an insulating gasket (not shown), a venting device (not shown), a PTC element (not shown), and a terminal plate (not shown) connecting the second polarity terminal (112) and the positive electrode, and the like. However, the cap assembly (115) is not necessarily limited to these components, and any general cap assembly equipped in the battery cell (110) is applicable.

Referring now to FIGS. 3 and 4, the battery cell assembly (100), according to an aspect of the present disclosure, comprises a housing (190) configured to receive a plurality of battery cells (110) in the respective assembled locations within an interior of the housing (190). For example, the housing (190) may comprise an interior storage space that corresponds to or is larger than the size of the plurality of battery cells (110). The housing (190) may be openable so as to access the interior of the housing (190). The housing (190) may comprise an electrical insulation material. For example, the housing (190) may comprise a plastic material.

In one or more aspects, the housing (190) may comprise an upper cover (120) and a lower cover (170). The upper cover (120) may house the upper and middle portions of the plurality of battery cells (110). Referring now to FIG. 3, the upper cover (120) may comprise an upper wall (121), and sidewalls (123) extending downward from the outer periphery of the upper wall (121). The lower cover (170) of the battery cell assembly (100) may be detachably secured to the lower portion of the upper cover (120). The lower cover (170) and the upper cover (120) may be detachably secured by any suitable fastener. For example, the upper cover (120) and the lower cover (170) may be secured using screws, bolts, or any other suitable fastener. In one or more aspects, the lower cover (170) may cover the lower portion of each of the plurality of battery cells (110). In such aspects, a plurality of mounting grooves (192) accommodating the lower portion of each of the plurality of battery cells (110) may be formed in the lower cover (170).

Referring now to FIG. 4, the battery cell assembly (100), according to one or more aspects of the present disclosure, comprises a plurality of holders (160). Each of the plurality of holders (160) may be positioned within the interior of the housing (190) and coupled to the housing (190). In one or more aspects, the plurality of holders (160) is coupled to the inside of the upper cover (120). The plurality of holders (160) is configured so that each of the plurality of battery cells (110) is detachable from its respective holder 160. Referring now to FIG. 5, the holder (160) may be configured to attach to the upper portion of the battery cell (110). As shown in FIG. 6, the holder (160) may be configured to detach from the upper portion of the battery cell (110).

In one or more aspects, the plurality of battery cells (110) may be attached and detached from the holder (160) such that the battery cells (110) may be installed into and removed from the housing (190) without damage to the holders (160) or an electrical connection member, such as a bus-bar. The battery cells (110) may be individually replaceable. This configuration may allow individual defective battery cells (110) to be disconnected and removed from the battery cell assembly (100) without damaging the electrical connection member and electrically disconnecting functioning battery cells (110). In one or more aspects, the battery cell assembly (100) may be free from adhesives that join adjacent battery cells (110). In such aspects, individual battery cells (110) may be removed from the battery cell assembly (100) without the need to remove adhesive from the battery cells (110). This may reduce the cost and time required to replace individual battery cells (110) in the battery cell assembly (100). Additionally, this may prevent functional battery cells (110) from being discarded or replaced along with defective battery cells (110) resulting in reduced waste and environmental pollution.

In one or more aspects, the holder (160) may be configured so that when the second polarity terminal (112) is in contact with the second polarity bus-bar portion (130), the first polarity bus-bar portion (150) is in contact with the first polarity terminal (114).

In one or more aspects, the holder (160) may be configured so that when the battery cell (110) is separated from the holder (160), the second polarity terminal (112) and the first polarity terminal (114) are sequentially separated from the second polarity bus-bar portion (130) and the first polarity bus-bar portion (150) in that order.

FIG. 7 is an exploded perspective diagram schematically showing components of a holder (160) separated from each other according to an aspect of the present disclosure. FIG. 8 is an exploded perspective diagram schematically showing a second polarity bus-bar portion (130) of a holder (160) according to an aspect of the present disclosure. FIG. 9 is a bottom perspective diagram schematically showing components of a holder (160) according to an aspect of the present disclosure. FIG. 10 is a partial cross-sectional diagram schematically showing a holder (160) and a battery cell (110) according to an aspect of the present disclosure.

Referring now to FIGS. 6-8 the holder (160) may comprise a second polarity bus-bar portion (130). In one or more aspects, the second polarity bus-bar portion (130) may be positive electrode bus-bar. The second polarity bus-bar portion (130) and the battery cell (110) may be electrically connected by contacting the second polarity terminal (112) of the battery cell (110) when the battery cell (110) and the holder (160) are positioned in the assembled location. In one or more aspects, the second polarity bus-bar portion (130) may be positioned adjacent to an end of the battery cell (110) along the axis when the battery cell is positioned in the assembled location. Referring to FIG. 6, the second polarity bus-bar portion (130) may comprise a metal plate comprising a conductive portion (136).

In one or more aspects, each of the plurality of holders (160) comprises an electrically insulating material (140). The electrically insulating material (140) may comprise a plastic material. The electrically insulating material (140) may be positioned between the first polarity bus-bar portion (150) and the second polarity bus-bar portion (130). The electrically insulating material (140) may be coupled to the second polarity bus-bar portion (130). The electrically insulating material (140) may contact the second polarity bus-bar portion (130) such that at least a part of the second polarity bus-bar portion (130) is exposed. In one or more aspects, the conductive portion (136) of the second polarity bus-bar portion (130) may be bent at least once toward the electrically insulating material (140). The electrically insulating material (140) may comprise a protruding portion (144) that is molded around the conductive portion (136) of the second polarity bus-bar portion (130). In one or more aspects, the electrically insulating material (140) surrounds an opening (146) therethrough to permit electrical contact with the conductive portion (136) of the second polarity bus-bar portion (130) through the opening (146). The electrically insulating material (140) and the second polarity bus-bar portion (130) may be joined by any suitable method. For example, electrically insulating material (140) and the second polarity bus-bar portion (130) may be joined by an insert injection method where the second polarity bus-bar portion (130) may be inserted into a mold followed by the injection of a molten plastic material into the mold, and curing the plastic material to form the electrically insulating material (140).

In one or more aspects, each of the plurality of holders (160) may comprise a first polarity bus-bar portion (150) connected to the first polarity terminal (114). In one or more aspects, the first polarity bus-bar portion (150) may be a negative electrode bus-bar portion. The first polarity bus-bar portion (150) may be combined with the electrically insulating material (140) by any suitable means. For example, the first polarity bus-bar portion (150) may be combined with the electrically insulating material (140) by an adhesive or an adhesive tape (174). In one or more aspects, the first polarity bus-bar portion (150) and the second polarity bus-bar portion (130) may be coupled together with the first polarity bus-bar portion (150) being disposed above the second polarity bus-bar (130) portion along the axis of the battery cell (110) when the battery cell (110) is in the assembled location. The first polarity bus-bar portion (150) may define an opening (151) therethrough so as to permit electrical contact with a conductive portion (136) of the second polarity bus-bar portion (130) through the opening (151).

Referring now to FIGS. 7-9, the second polarity bus-bar portion (130) may comprise a disk portion (132). The disk portion (132) may be located at a lower portion of the electrically insulating material (140). The disk portion (132) may have a circular outer periphery portion and a flat plate shape.

In one or more aspects, the second polarity bus-bar portion (130) may comprise a displaceable member (134) biased toward the assembled location of the battery cell (110) in a direction parallel to the axis of the battery cell (110). The displaceable member (134) may be pressed into contact with the second polarity terminal (112) when the battery cell (110) is in the assembled location and the second polarity terminal (112) is at the end of the battery cell (110) along the axis. The displaceable member (134) may have a shape protruding from the disk portion (132) toward the second polarity terminal (112). In one or more aspects, the displaceable member (134) may be biased toward the assembled location of the battery cell by an elastic member (139) positioned between the displaceable member (134) and a portion of the second polarity bus-bar portion (130) extending transverse to the axis of the battery cell (110) when the battery cell is positioned in the assembled location. In some aspects, the displaceable member (134) may be configured so that its protruding length is variable depending on the distance between the second polarity bus-bar portion (130) and the second polarity terminal (112).

In one or more aspects, the second polarity bus-bar portion (130) may comprise a conductive portion (136). The conductive portion (136) may be configured to be inserted into opening (151) of the first polarity bus-bar portion (150). The conductive portion (136) may have a shape that protrudes and extends from the disk portion (132). The conductive portion (136) may be bonded and electrically connected to a connection member (180) (outer bus-bar) to be described below.

Referring again to FIGS. 9 and 10, the displaceable member (134) may include a body portion (138). The body portion (138) may have electrical conductivity. The body portion (138) may comprise an electrically conductive metal. At least a portion of the body portion (138) may be embedded in the electrically insulating material (140). In one or more aspects, the body portion (138) of the displaceable member (134) may be inside of the electrically insulating material (140) after an insert injection method is performed, as previously described.

In one or more aspects, the displaceable member (134) may comprise a moving portion (137). The moving portion (137) may have electrical conductivity. In one or more aspects, the moving portion (137) may comprise an electrically conductive metal material. The moving portion (137) may be positioned at a lower portion of the body portion (138). In one or more aspects, the moving portion (137) may be configured to directly contact the second polarity terminal (112). The moving portion (137) may be configured to be movable in a direction normal to the second polarity terminal (112).

In one or more aspects, the displaceable member (134) may comprise an elastic member (139). The elastic member (139) may be embedded into the body portion (138). The elastic member (139) may be configured to elastically pressurize the moving portion (137) toward the second polarity terminal (112).

In one or more aspects, the battery cell assembly (100) of the present disclosure can electrically connect the second polarity terminal (112) and the second polarity bus-bar portion (130) with high reliability by comprising a displaceable member (134) as described hereinabove. In addition, the displaceable member (134) may elastically pressurize the second polarity terminal (112), which may prevent deformation or damage to the displaceable member (134) and the second polarity terminal (112). This may reduce or prevent defective connections between the second polarity terminal (112) of the battery cell (110) and the displaceable member (134) of the second polarity bus-bar portion (130).

Referring again to FIGS. 8 and 9, the displaceable member (134) may be provided to penetrate the disk portion (132). In such embodiments, at least one through hole (133) may be formed in the disk portion (132) so that the displaceable member 134 (134) may penetrate the disk portion (132). The displaceable member (134) may be equipped with a stopper (135) on the body portion (138). The stopper (135) may be configured to prevent the moving portion (137) from moving in the insertion direction when it is inserted into the through hole (133).

In one or more aspects, the battery cell assembly (100) of the present disclosure may further comprise a conductive solder (not shown) for electrical connection between the second polarity terminal (112) and the second polarity bus-bar portion (130) and stable fixation with the electrically insulating material (140). Referring now to FIG. 10, the conductive solder may be filled between an insertion groove (145) and the displaceable member (134), and between the second polarity bus-bar portion (130) and the displaceable member (134).

In one or more aspects, the electrically insulating material (140) may comprise a disk portion (142). The disk portion (142) may cover an upper portion of the disk portion (132) of the second polarity bus-bar portion (130). In one or more aspects, the disk portion (142) may be coupled to the upper portion of the disk portion (132). The disk portion (142) may comprise electrical insulation.

In one or more aspects of the present disclosure, the electrically insulating material (140) may comprise a protrusion portion (144). The protrusion portion (144) may cover a part of the side and upper surfaces of the conductive portion (136) of the second polarity bus-bar portion (130). The protrusion portion (144) may have a shape protruding in an upward direction from the disk portion (142). The electrically insulating material (140) may surround an opening (146) therethrough so as to permit electrical contact with a conductive portion (136) of the second polarity bus-bar portion (130) through the opening (146). In some aspects, the opening (146) may be formed in the protrusion portion (144). The opening (146) may be provided inside the protrusion portion (144) so that the upper portion of the conductive portion (136) of the second polarity bus-bar portion (130) is exposed. In one or more aspects, the conductive portion (136) of the second polarity bus-bar portion (130) may be embedded into the inside of the protrusion portion (144). In addition, the disk portion (142) may comprise an insertion groove (145). The insertion groove (145) may accommodate the end of the body portion (138) of the displaceable member (134).

Referring now to FIG. 7, the first polarity bus-bar portion (150) may comprise a disk portion (152). The disk portion (152) may be coupled to the upper cover (120) of the housing (190). In one or more aspects, a double-sided adhesive tape (not shown) or an adhesive (not shown) may be added between an upper surface of the disk portion (152) and an inner surface of the upper cover (120). The disk portion (152) may be bonded to the upper cover (120). However, the connection of the upper cover (120) and the disk portion (152) is not necessarily limited to such a bonding method. In one or more aspects, the disk portion (152) may be coupled to the inner surface of the upper cover (120) by mechanical coupling. For example, the disk portion (152) may be coupled to the upper cover (120) using an interference fit method or an insert injection method.

In one or more aspects, the first polarity bus-bar portion (150) may comprise a convex portion (154). The convex portion (154) may protrude in an upward direction from the disk portion (152) to form a space in which the electrically insulating material (140) may be accommodated. The negative electrode convex portion (154) may be formed through a casting or rolling process.

In one or more aspects, the first polarity bus-bar portion (150) may comprise a first displaceable portion (158) biased toward the assembled location of the battery cell (110). The first displaceable portion (158) may be pressed into contact with the portion of the casing (116) defining the first polarity terminal (114) when the battery cell (110) is in the assembled location. In one or more aspects, the portion of the casing encircling the axis of the battery cell (110) has a smooth outer surface against which the first displaceable portion (158) is pressed into contact. The first displaceable portion (158) may be elastic and may exert pressure on the casing (116) of the battery cell (110) when the battery cell (110) is in the assembled position. The first displaceable portion (158) may have a shape in which a part of the first displaceable portion (158) protrudes toward the first polarity terminal (114). In one or more aspects, the first displaceable portion (158) may have a structure bent in a V-shape toward the casing (116). Such a displaceable portion (158) may exert pressure on the first polarity terminal (114) when battery cell (110) is in the assembled position to provide consistent contact between the displaceable portion (158) and the first polarity terminal (114).

The first displaceable portion (158) may be a portion of an elongated extension (156) of the first polarity bus-bar portion (150). The elongated extension (156) may be oriented so as to extend along a portion of the casing (116) when the battery cell (110) is in the assembled position. In one or more aspects, the elongated extension (156) may be bent in a downward direction from the disk portion (152). The elongated extension (156) may extend from the disk portion (152) to directly contact the first polarity terminal (114).

In one or more aspects, the elongated extension (156) defines an opening (157). The first displaceable portion (158) may be biased toward the assembled location of the battery cell (110) through the opening (157). In some aspects, opening (157) may be a perforation in the elongated extension (156). The first displaceable portion (158) may extend from the inner periphery of the connection opening (157). The opening (157) may be larger than the first displaceable portion (158). In such aspects, when the first displaceable portion (158) contacts the first polarity terminal (114), it does not contact the inner periphery of the opening (157), even if the first displaceable portion (158) is deformed. This may prevent damage to the first displaceable portion (158) and the elongated extension (156) due to collision of the first displaceable portion (158) with the elongated extension (156).

In one or more aspects, the first polarity bus-bar portion (150) may comprise multiple displaceable portions (158). For example, the first polarity bus-bar portion (150) may comprise 2, 3, 4, 5, 6, or more displaceable portions (158). In aspects where the first polarity bus-bar portion (150) comprises multiple displaceable portions (158), the displaceable portions (158) may be circumferentially spaced apart around the assembled location of the battery cell (110). For example, the first polarity bus-bar portion (150) may comprise a first displaceable portion (158), a second displaceable portion (158) and a third displaceable portion (158) wherein the first, second, and third displaceable portions are circumferentially spaced apart around the assembled location of the battery cell (110). The second displaceable portion (158) may be positioned on an opposing side of the assembled location from the first displaceable portion (158). The second displaceable portion (158) may be biased toward the assembled location of the battery cell such that the second displaceable portion (158) is pressed into contact with the portion of the casing (116) defining the first polarity terminal (114) when the battery cell (110) is in the assembled location. In such aspects, the second displaceable portion may be pressed into contact with the first polarity terminal (114) in a direction opposite the direction in which the first displaceable portion (158) is pressed into contact with the first polarity terminal (114). In one or more aspects, the second polarity bus bar portion (130) may be in a region between the first displaceable portion (158) and the second displaceable portion (158).

In one or more aspects, the first polarity bus-bar portion (150) may comprise a third displaceable portion (158) and a fourth displaceable portion (158), as depicted in FIGS. 5-7. The third and fourth displaceable portions may oppose one another across the assembled location of the battery cell (110). The third and fourth displaceable portions (158) may be biased toward the assembled location of the battery cell such that the third and fourth displaceable portions are pressed into contact with the portion of the casing (116) defining the first polarity terminal (114) when the battery cell (110) is in the assembled location.

In one or more aspects, the first polarity bus-bar portion (150) may comprise a plurality of elongated extensions (156). In some aspects, the first polarity bus-bar portion (150) may comprise an elongated extension (156) for each displaceable portion (158). Referring now to FIG. 7, the first polarity bus-bar portion (150) may comprise four elongated extensions (156). The first polarity bus-bar portion (150) may also comprise four displaceable portions (158). The four elongated extensions (156) may be bent in a downward direction from the disk portion (152) to connect to the first polarity terminal (114) of the case (116) of the battery cell (110).

Aspects of the first polarity bus-bar portion (150) in the battery cell assembly (100) of the present disclosure comprising a convex portion (154) an elongated extension (156) and a displaceable portion (158) and the second polarity bus-bar portion (130) can be stably accommodated and coupled, inducing stable contact between the second polarity bus-bar portion (130) and the second polarity terminal (112) and directly connecting the first polarity terminal (114) of the battery cell (110) with the first polarity bus-bar portion (150) of the holder (160). Ultimately, such a first polarity bus-bar portion (150) may facilitate a compact holder (160), thereby effectively increasing the energy density of the battery cell assembly (100).

It should be understood that the first polarity bus-bar portion (150) of the present disclosure is not necessarily limited to the first polarity bus-bar portion (150) depicted in FIGS. 5-10. FIG. 11 is a perspective diagram schematically showing an appearance inside a first polarity bus-bar portion (150A) of a battery cell assembly according to another aspect of the present disclosure.

Referring to FIG. 11, in the first polarity bus-bar portion (150A) of the battery cell assembly according to another aspect of the present disclosure, the elongated extension (156) and displaceable portion (159) may have a shape different from that of the elongated extension (156) and displaceable portion (158) of the first polarity bus-bar portion (150) in FIG. 7. For example, the connection opening (157) is not formed in the elongated extension (156) of FIG. 11, and the first polarity bus-bar portion (150A) may comprise a displaceable portion (159) having a concavo-convex shape protruding toward the casing (116). Such a co displaceable portion (159) may exert pressure on the negative electrode terminal (114) through the concavo-convex shape when the battery cell (110) is in the assembled location.

Although one embodiment of a holder (160) and its subcomponents has been discussed above and illustrated in FIGS. 4-11, other configurations of holders may be utilized in accordance with the present disclosure. For example, alternative holders may be utilized that have the configurations of any of the connectors for cylindrical batteries disclosed in any of the following U.S. design patent applications, all of which were filed on Aug. 5, 2024 naming Dong Won Yoo as an inventor: application Ser. No. 29/955,963; application Ser. No. 29/955,990; Appl. No. 29/955,983; application Ser. No. 29/955,992; application Ser. No. 29/955,971; application Ser. No. 29/955,997; application Ser. No. 29/955,978; and application Ser. No. 29/956,004. The entire disclosures of all of such U.S. design patent applications are hereby incorporated by reference herein.

FIG. 12 is a perspective diagram schematically showing additional components of a battery cell assembly (100), according to one or more aspects of the present disclosure, except for a connection member (180). FIG. 13 is a partial perspective diagram schematically showing an appearance of a region A in the battery pack of FIG. 12.

Referring again to FIGS. 12 and 13 together with FIG. 3, the upper cover (120) may have a second polarity opening (124) formed for contact between the second polarity bus-bar (130) and a connection member (180) to be described below. In one or more aspects, the second polarity opening (124) may have an open shape so that the second polarity bus-bar portion (130) may be exposed to the outside.

Also, the upper cover (120) may have a first polarity opening (122) formed for contact between the first polarity bus-bar portion (150) and a connection member (180) to be described below. In one or more aspects, the first polarity opening (122) may have an open shape so that the first polarity bus-bar portion (150) is exposed to the outside.

In addition, a connection groove (127) configured to accommodate a connection member (180) may be formed in the upper cover (120). For example, the connection groove (127) may have a size corresponding to that of the connection member (180).

The battery cell assembly (100) of the present disclosure may further comprise a plurality of connection members (180). The connection member (180) may be mounted on the upper portion of the upper cover (120). Each of the plurality of connection members (180) may comprise at least one of a second polarity contact portion (182) and a first polarity contact portion (184). The second polarity contact portion (182) may be configured to contact the disk portion (132) of the second polarity bus-bar portion (130) through the second polarity opening (124). In one or more aspects, the first polarity contact portion (184) may be configured to contact the disk portion (152) of the first polarity bus-bar portion (150) through the first polarity opening (122). The connection member (180) may have a shape extending along the connection groove (127) formed on the upper surface of the upper cover (120). In one or more aspects, the connection member (180) may have a shape bent according to the upper surface structure of the upper cover (120). For example, as depicted in FIG. 3, the battery cell assembly (100) of the present disclosure may comprise a connection member (180) electrically connected to a plurality of second polarity bus-bar portions (130) and a plurality of first polarity bus-bar portions (150).

FIG. 14 is a bottom perspective diagram schematically showing an upper cover (120) of a battery cell assembly (100) according to an aspect of the present disclosure.

Referring now to FIG. 14 together with FIG. 4, the upper cover (120) may comprise a storage portion (126) accommodating the holder (160). The storage portion (126) may be formed on the inner surface of the upper cover (120). The storage portion (126) may have a groove shape corresponding to the outer surface of the holder (160). For example, the storage portion (126) may have shape such that the disk portion (152) and the convex portion (154) of the first polarity bus-bar portion (150) are inserted therein. In one or more aspects, the holder (160) may be bonded to the storage portion (126) using an adhesive or a double-sided tape. However, the holder (160) is not necessarily coupled to the upper cover (120) by a bonding method. In one or more aspects, the first polarity bus-bar portion (150) may be coupled to the upper cover (120) through injection molding. An injection molding process may allow multiple first polarity bus-bar portions (150) to be coupled to the upper cover (120) at the same time, which may shorten production time relative to processes where first polarity bus-bar portions (150) to be coupled to the upper cover (120) individually. Additionally, an injection molding process may prevent defects due to inadequate adhesion relative to processes where adhesives are used to couple the first polarity bus-bar portions (150) and the upper cover (120).

In one or more aspects, a fixing groove (128) may be formed in the storage portion (156). The fixing groove (128) may be configured so that the elongated extension (156) of the first polarity bus-bar portion (150) may be accommodated therein. The elongated portion (156) may be fixed to the fixing groove (128) by an interference fit.

FIG. 15 is a schematic diagram schematically showing a battery pack (200) according to an of the present disclosure.

Referring to FIG. 15, the battery pack (200) comprises at least one battery cell assembly (100), and a battery management system (BMS) (210). The battery management system may perform battery cell overcharge/overdischarge prevention and temperature management, and the like. The battery management system (210) may be embedded into the inside of the battery pack (200).

FIG. 16 is a schematic diagram schematically showing a transportation device (300) according to an aspect of the present invention.

Referring to FIG. 16, a transportation device (300) comprises the battery pack (200) of the present disclosure. That is, the transportation device (300) may have the battery pack (200) embedded therein. The transportation device (300) may use the battery pack (200) as a power supply for movement. For example, the transportation device (300) may be an electric vehicle, an electric bicycle, an electric scooter, an electric wheelchair, an unmanned robot, an unmanned aircraft, and the like.

Aspects of the present disclosure, as described above, have been disclosed for illustrative purposes, and those skilled in the art will be able to make various modifications, changes, and additions that are within the spirit and scope of the present disclosure. Such modifications, changes, and additions should be regarded as falling within the scope of the following claims.

LIST OF REFERENCE NUMERALS

60: adhesive
50: bus-bar
40: battery cell assembly
30: battery cell
20: welding rod
10: electrode terminal
100: battery cell assembly
110, 112, 114, 115, 116: battery cell, second polarity terminal, first polarity terminal, cap assembly, casing
120: upper cover
122, 124, 126, 127, 128: first polarity opening, second polarity opening, storage portion, connection groove, fixing groove
130: second polarity bus-bar portion
132, 134, 136: disk portion, displaceable member, conductive portion
137, 138, 139: moving portion, body portion, elastic member
133, 135: through hole, stopper
140: electrically insulating material
142, 144, 146: disk portion, protrusion portion, opening
150: first polarity bus-bar portion
151: opening
152, 154, 156, 157, 158, 159: disk portion, convex portion, elongated extension, opening, displaceable portion, displaceable portion
160: holder
180, 182, 184: connection member, second polarity contact portion, first polarity contact portion
190, 192: housing, mounting groove
200: battery pack
300: transportation device

The invention claimed is:

1. A holder configured to detachably connect to a battery cell of a battery cell assembly, comprising:

a first polarity bus-bar portion having a first electrical contact configured to removably contact a first polarity terminal of a battery cell when the battery cell is positioned in an assembled location in the battery cell assembly, the battery cell having at least a portion of a casing encircling an axis of the battery cell, the portion of the casing defining the first polarity terminal, wherein the first polarity bus-bar portion includes a first displaceable portion biased radially inwardly towards the axis of the battery cell when in the assembled location such that the first electrical contact is pressed into contact with the portion of the casing defining the first polarity terminal, the first polarity bus-bar portion defining an opening therethrough along the axis of the battery cell in the assembled location;

a second polarity bus-bar portion having a second electrical contact configured to removably contact a second polarity terminal of the battery cell when the battery cell is positioned in the assembled location, the second polarity terminal being at an end of the battery cell along the axis, the second polarity bus-bar portion having a conductive portion extending away from the second electrical contact along the axis and through the opening of the first polarity bus-bar portion when the battery cell is in the assembled location; and an electrically insulating material surrounding the conductive portion of the second polarity bus-bar portion about the axis when the battery cell is in the assembled location, such that the electrically insulating material extends through the opening of the first polarity bus-bar portion.

2. The holder of claim 1, wherein the first displaceable portion is a portion of an elongated extension of the first polarity bus-bar portion, the elongated extension oriented so as to extend along the portion of the casing when the battery cell is in the assembled position.

3. The holder of claim 2, wherein the elongated extension defines an aperture, the first displaceable portion being biased radially inwardly through the aperture towards the axis of the battery cell when in the assembled location.

4. The holder of claim 1, wherein the first polarity bus-bar portion includes a second displaceable portion and a third displaceable portion, and wherein the first, second, and third displaceable portions are circumferentially spaced apart around the assembled location of the battery cell.

5. The holder of claim 1, wherein the first polarity bus-bar portion includes a second displaceable portion positioned on an opposing side of the assembled location from the first displaceable portion, the second displaceable portion biased towards the assembled location of the battery cell such that a third electrical contact of the first polarity bus-bar portion is pressed into contact with the portion of the casing defining the first polarity terminal when the battery cell is in the assembled location.

6. The holder of claim 5, wherein the first polarity bus-bar portion includes a third displaceable portion and a fourth displaceable portion, the third and fourth displaceable portions opposing one another across the assembled location of the battery cell, and wherein the third and fourth displaceable portions are each biased towards the assembled location of the battery cell such that a fourth electrical contact and a fifth electrical contact, respectively, of the first polarity bus-bar portion are pressed into contact with the portion of the casing defining the first polarity terminal when the battery cell is in the assembled location.

7. The holder of claim 5, wherein the second polarity bus-bar portion is in a region between the first displaceable portion and the second displaceable portion.

8. The holder of claim 1, wherein the second polarity bus-bar portion includes a displaceable member biased towards the assembled location of the battery cell in a direction parallel to the axis of the battery cell, such that the displaceable member is pressed into contact with the second polarity terminal when the battery cell is in the assembled location.

9. The holder of claim 8, wherein the displaceable member is biased towards the assembled location of the battery cell by an elastic member positioned between the displaceable member and a portion of the second polarity bus-bar portion extending transverse to the axis of the battery cell when the battery cell is positioned in the assembled location.

10. The holder of claim 1, wherein the electrically insulating material positioned between the first polarity bus-bar portion and the second polarity bus-bar portion.

11. The holder of claim 1, wherein the electrically insulating material is molded around the conductive portion of the second polarity bus-bar portion.

12. The holder of claim 1, wherein the first polarity bus-bar portion and the second polarity bus-bar portion are coupled together with the first polarity bus-bar portion being disposed above the second polarity bus-bar portion along the axis of the battery cell when the battery cell is in the assembled location.

13. A battery assembly, comprising:
a housing configured to receive a plurality of battery cells in the respective assembled locations within an interior of the housing, the housing being openable so as to access the interior of the housing; and
a plurality of holders as defined in claim 1, each of the plurality of holders being positioned within the interior and coupled to the housing.

14. The battery assembly of claim 13, wherein the housing includes an upper cover detachably secured to a lower cover.

15. The battery assembly of claim 13, further comprising a plurality of battery cells positioned in the respective assembled locations within the interior of the housing, each of the plurality of battery cells being engaged with a respective one of the plurality of holders such that the first electrical contact of the first polarity bus-bar portion of the respective holder contacts the first polarity terminal of the respective battery cell and the second electrical contact of the second polarity bus-bar portion of the respective holder contacts the second polarity terminal of the respective battery cell.

16. The battery assembly of claim 15, wherein each of the plurality of battery cells is a cylindrical battery cell, such that the portion of the casing encircling the axis of the battery cell has a circular profile orthogonal to the axis.

17. The battery assembly of claim 15, wherein the first polarity terminal of each of the battery cells has a negative polarity, and wherein the second polarity terminal of each of the battery cells has a positive polarity.

18. An electric vehicle comprising the battery assembly of claim 13.

* * * * *